United States Patent

Pohl et al.

Patent Number: 4,775,192
Date of Patent: Oct. 4, 1988

[54] APPARATUS FOR THE CONTROL OF BRAKE PRESSURE

[75] Inventors: Wolfgang Pohl, Garbsen; Erich Reinecke, Burgdorf; Hans-Joachim Schulz, Wedemark, all of Fed. Rep. of Germany

[73] Assignee: WABCO Westinghouse Fahrzeugbremsen GmbH, Hanover, Fed. Rep. of Germany

[21] Appl. No.: 39,345

[22] Filed: Apr. 17, 1987

[30] Foreign Application Priority Data

May 2, 1986 [DE] Fed. Rep. of Germany ....... 3615002

[51] Int. Cl.⁴ ...................... B60T 13/00; B60T 15/02; B60T 15/12
[52] U.S. Cl. ......................................... 303/7; 303/40; 303/54
[58] Field of Search ................... 303/7, 32, 40, 47, 53, 303/54, 56, 118

[56] References Cited

U.S. PATENT DOCUMENTS 3,041,114 6/1962 Stelzer .................................... 303/7
3,944,294 3/1976 Masuda et al. ........................ 303/46

FOREIGN PATENT DOCUMENTS 1958808 11/1973 Fed. Rep. of Germany .
2334649 1/1975 Fed. Rep. of Germany ........ 303/40
3229836 2/1984 Fed. Rep. of Germany .
3338690 5/1985 Fed. Rep. of Germany .
3409303 9/1985 Fed. Rep. of Germany ........ 303/40
1202934 1/1986 U.S.S.R. .................................. 303/7
0889581 2/1962 United Kingdom ................. 303/40

Primary Examiner—Andres Kashnikow
Assistant Examiner—Timothy Newholm
Attorney, Agent, or Firm—J. O. Ray, Jr.

[57] ABSTRACT

An apparatus is disclosed for the control of brake pressure in a trailer pulled by a tractor. The apparatus includes a two-circuit controllable relay valve as the trailer control valve. The first circuit is controlled by the brake valve of the tractor with the pressure from the brake apparatus of such tractor. The second circuit can be optionally-connected to a distribution valve with a pressure medium source with a specified pressure or with atmosphere. Activation of the distribution valve is controlled so that the distribution valve connects the second circuit with the pressure medium source before or at the beginning of the activation of the first circuit. With this apparatus, the brake pressure can be increased in the brake apparatus of the trailer prior to increase of the brake pressure in the brake apparatus of the tractor. The level of brake pressure increased first in the brake unit of the trailer can be regulated by a set screw acting on the trailer control valve.

14 Claims, 1 Drawing Sheet

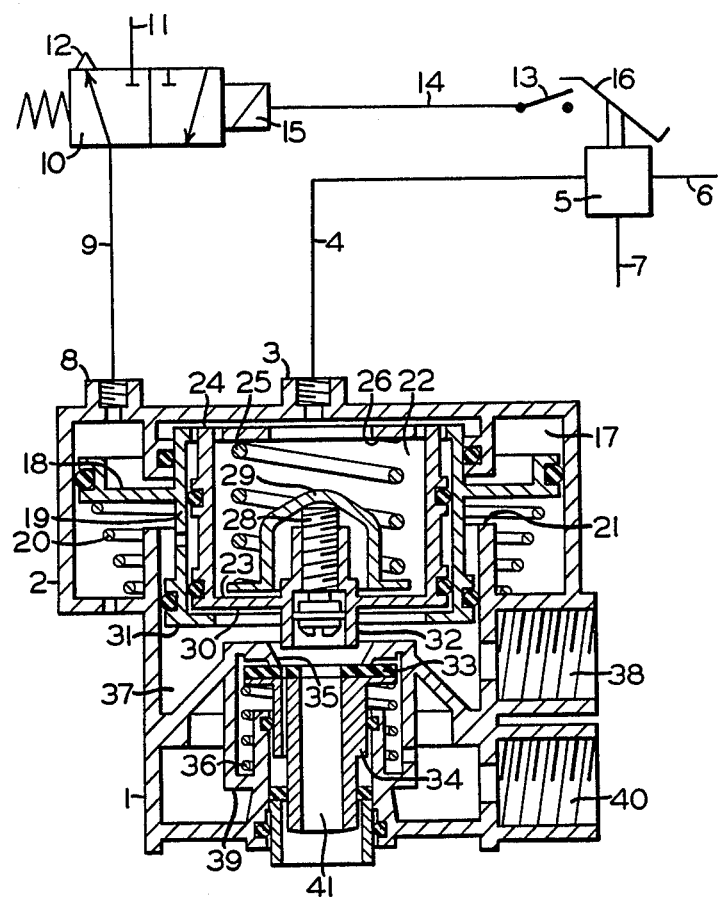

ent No. DE-OS 33 38 690. With the apparatus of this
APPARATUS FOR THE CONTROL OF BRAKE PRESSURE

FIELD OF THE INVENTION

The present invention relates, in general, to brake apparatus and, more particularly, the invention relates to an apparatus for the control of brake pressure on a trailer vehicle pulled by a tractor vehicle.

BACKGROUND OF THE INVENTION

Such a brake apparatus is described by German Patent No. DE-OS 33 38 690. With the apparatus of this prior art, during the braking process which is triggered by activating the brake valve of the tractor vehicle, the brake pressure is increased in the brake mechanism of the trailer vehicle slightly prior to the brake pressure in the tractor vehicle. In this manner, during the braking process, the tractor vehicle and trailer vehicle are kept separated.

The apparatus of the prior art discloses the use of a valve apparatus with two control pistons, connected in series, or a valve having two active surfaces acting on a control piston, which can be controlled in a temporally-staggered manner independently of one another, each with a control circuit with its own pressure medium. The present control circuit, which induces the staggered braking of the trailer vehicle prior to the tractor vehicle, is fed by a pressure medium with a preset and preferably even pressure, so that repeated braking processes can be initiated with uniform effect.

An adaptation to the variable operation of the mechanical control elements of the braking apparatus of the trailer vehicle, as well as a universal application of the valve apparatus of the prior act with different trailer types and manufacturers, each with different mechanical power requirements for the initiation of the braking process, can be accomplished with the apparatus of the prior art only by extensive use of complex means, for example, an adjustable pressure relief valve in the pilot control circuit, downstream of the valve apparatus of the prior art.

SUMMARY OF THE INVENTION

An apparatus is taught which controls the brake pressure of a trailer being pulled by a tractor. The apparatus includes a valve having a first control piston which can be pressurized with the brake control pressure released by a brake valve. The valve also includes a second control piston which can be pressurized by a switchable distribution valve with the pressure being supplied by a pressure medium source. The first control piston and the second control piston are positioned such that they can move in relation to one another. The distribution valve connecting the second control piston with the pressure medium source can be switched as a function of the position of an activation mechanism of the brake valve. The second control piston can be pressurized before the first control piston with the pressure from the pressure medium source. The brake apparatus of the trailer can be connected to a pressure medium source via a valve activated by at least one of the first control piston and the second control piston. The first control piston is connected by a spring to the second control piston, and is bounded by a stop on the second control piston acting against the force of the spring. A means is provided which can adjust the force that the spring exerts between the first control piston and the second control piston.

OBJECTS OF THE INVENTION

One of the primary objects of the present invention, therefore, is to provide an improved brake apparatus so that the level of braking force to be applied by the pilot control circuit to the trailer vehicle braking apparatus can be adapted, in particular, to the mechanical resistances to be overcome and to the return forces of the braking elements of the trailer vehicle.

Another object of the present invention is to provide a trailer brake apparatus in which the effective pilot braking force in the brake apparatus of the trailer vehicle can easily be regulated according to the individual braking action of the vehicle during operation.

The above objects and advantages of the present invention, in addition to various other objects and advantages of such invention, will become more readily apparent to those persons skilled in the vehicle braking art from the following more detailed description of the invention, when such description is taken in conjunction with the attached drawing and with the appended claims.

BRIEF DESCRIPTION OF THE DRAWING

FIG. 1 is a schematic illustration, partially in cross-section, which shows a two-circuit apparatus for control of brake pressure for a trailer vehicle pulled by a tractor vehicle.

BRIEF DESCRIPTION OF THE INVENTION

Now referring to the drawing in which there is illustrated a valve apparatus 1 which operates as a trailer control valve. The valve 1 includes a housing 2 and is connected to a brake valve 5 by way of a pressure medium connection 3 and a pressure medium line 4. A pressure medium source (not shown), connected via a pressure medium line 6, can be connected by way of the brake valve 5 with a pressure medium line 4 and via a pressure medium line 7 with the brake apparatus of the tractor vehicle.

A pressure medium connection 8 of the valve apparatus 1 is connected by way of a pressure medium line 9 with a distributing valve 10, by means of which the pressure medium connection 8 can be connected either by the pressure medium line 11 with a pressure medium source or with an outlet 12 to the atmosphere. The distributing valve 10 can be switched electrically. For this purpose, a switching apparatus 13, which is connected via an electrical line 14 with an electrical control input 15 of the distribution valve 10, can be switched as a function of the position of an activating mechanism 16 of the valve apparatus 1.

The pressure medium connection 8 empties into a pressure medium chamber 17. The pressure medium chamber 17 is bounded by an annular active surface 18 of a control piston 19. Under the action of a pressure medium in the pressure medium chamber 17, the control piston 19 can be moved against the force of a return spring 20 up to a stop 21 positioned on the housing 2.

The pressure medium connection 3 empties into a pressure medium chamber 22, which is bounded by the active surface 23 of a control piston 24. The control pistons 24 and 19 are telescoping and movable relative to one another. A spring 25 is supported, on one side, on an opening in the piston surface of the control piston 19 and, on the other side, by means of a spring plate 29 and a set screw 28 on the control piston 24. The control piston 24 rests by means of the force of the spring 25 with a part of active surface 30 on the stop 31 of the control piston 19. The control pistons 19 and 24 are prestressed against one another by the spring 25. The force of this stress is adjustable by means of the set screw 28.

The control piston 24 includes an elongated portion, which forms an outlet valve 32 in conjunction with a sealing surface 33 of a longitudinally-movable valve body 34 in the housing 2 by means of which a pressure medium chamber 37 can be connected with the atmosphere via an outlet 41. The sealing surface 33, in conjunction with a valve seat 35, forms an inlet valve which, in the rest position, is kept closed by means of the return spring 36 attached on the one hand to the housing 2 and, on the other hand, to the valve body 34. Below the control pistons 19 and 24, there is a pressure medium chamber 37 which is connected via an outlet 38 on the housing 2 with the brake apparatus of the trailer vehicle. This pressure medium chamber 37 can be connected by means of the inlet valve 33, 35 with a pressure medium chamber 39, which is connected to a pressure medium source, which serves as the pressure medium reservoir for the brake device of the trailer vehicle.

The pressure medium chamber 22 with the first control piston 24 forms, in connection with the brake valve 5, a first control circuit, by means of which the braking force of the trailer vehicle can be regulated. The pressure medium chamber 17 with the second control piston 19 forms, in connection with the distribution valve 10, a second control circuit, by means of which, slightly preceding the first control circuit, the brake apparatus of the trailer vehicle can be pressurized with a specified pressure by the pressure medium. Such pressure medium preferably being air.

The pressure medium chambers 17, 22, and 37 are permanently sealed off from one another, so that even in the various possible working positions of the valve apparatus 1, there can be no exchange of pressure medium between these chambers.

This apparatus, according to a presently preferred embodiment of the invention, operates as follows:

The activation of the brake valve 5, which is located in the tractor portion of the vehicle, trips a braking process in the brake systems of the tractor vehicle and of the trailer vehicle which are connected to one another, in that the pressure medium source connected to the pressure medium line 6 is connected via the pressure medium line 7 with the brake apparatus of the tractor vehicle, and via the pressure medium line 4 and the valve apparatus 1 with the brake apparatus of the trailer vehicle. Depending on the position of the activation mechanism 16, which is illustrated in the drawing as a brake pedal, of the brake valve 5, the braking of the tractor and of the trailer takes place more or less strongly. That is, the further down the brake pedal is depressed, the stronger the brake force being applied will be.

To achieve a braking of the trailer vehicle, which temporally precedes the braking of the tractor, the brake apparatus of the trailer vehicle is fed pressure medium at a specified pressure before the tractor vehicle. This means that even the mechanical portion of the brake apparatus of the trailer is activated before that of the tractor, i. e., the friction linings of the brakes of the trailer vehicle make contact with the brake drums or brake discs without any adverse effect on the driving properties of the tractor-trailer combination, specifically at the beginning of a slight braking, which may be unintentional.

At the beginning of a braking application, the switching apparatus 13 is activated by an initial stroke of the activation mechanism 16, and thus a switching current is fed to the electrical control input 15 by means of the electrical line 14. The distribution valve 10 is thereby switched from the base position into the work position, whereupon a pressure medium source connected to the pressure medium line 11 is connected with the pressure medium chamber 17 via the pressure medium line 9 and the pressure medium connection 8.

The pressurization of the active surface 18 of the control piston 19 causes a displacement of such control piston 19 against the force of the return spring 20 in the direction of the stop 21. The control piston 19 can move in this direction until it comes in contact with the stop 21. Even during the displacement of the control piston 19, the extension 32 of the valve body 34 is in contact, whereby when there is a further joint displacement of the control piston 19 and of the valve body 34, the inlet valve 32, 35 opens. The pressure medium in the pressure medium chamber 39 thereupon passes through the open inlet valve 32, 35 into the pressure medium chamber 37, and is fed via the outlet 38 to the brake apparatus of the trailer. When the pressure medium enters the pressure medium chamber 37, the active surface 30 of the control piston 24, facing the pressure medium chamber 37, and the negligible active surface 31 of the control piston 19, which also serves as a stop for the piston 24, are pressurized with the pressure prevailing in the pressure medium chamber 37.

The control piston 24 is thereupon displaced within the control piston 19 in the closing direction of the inlet valve 32, 35 against the force of the spring 25 and in the direction of the force of the spring 36, until equilibrium is achieved between the pressure of the pressure medium chamber 37 plus the force of the return spring 36 on the one hand and the pressure of the pressure medium chamber 22 plus the force of the spring 25 on the other hand.

The equilibrium condition defined above means that the control piston 24 is moved against the force of the spring 25 and is raised from the stop 31 into a position relative to the control piston 19, in which the inlet valve 32, 35 of the brake apparatus of the trailer vehicle is fed a specified early brake pressure.

The level of the early brake pressure can be regulated by adjusting, by means of the setscrew 28, the force of the spring 25 acting between the first control piston 24 and the second control piston 19. As a function of the degree of prestress of the spring 25, the brake apparatus of the trailer vehicle is fed a specified level of pressure through the inlet valve 32, 35 in the so-called pilot phase.

According to alternative embodiment of the present invention, instead of only one setscrew 28, there can also be several setscrews acting axially to the windings of the spring 25. Such an arrangement can be used, for example, to compensate for variances of the spring force direction from the axis of symmetry of the spring 25, and thereby to increase the precision of the response of the valve apparatus 1.

Corresponding to the constructive configuration of the valve apparatus 1, the setscrew 28, or setscrews, can also be located on the second control piston 19 with the direction of action on the first control piston 24.

The adjustment of the setscrew 28 is done with a tool, such as a screwdriver, which can be inserted through the outlet 41.

After activation of the brake apparatus of the trailer vehicle, triggered by the switch 13, another stroke of the activating mechanism 16 brings the brake valve 5 into the open position. The pressure medium source connected with the pressure medium line 6 is thereby connected with the brake apparatus of the tractor vehicle, and via the pressure medium line 4 and the valve apparatus 1 with the brake apparatus of the trailer vehicle. Depending on the position of the activating mechanism 16, the brake devices of the tractor and of the trailer are fed a more or less strong brake pressure.

The pressure medium fed via the pressure medium line 4 to the pressure medium chamber 22 causes a displacement of the control piston 24 toward the inlet valve 33, 35, so that the brake apparatus of the trailer vehicle is fed a continuously-adjustable brake pressure beyond the currently available pilot brake pressure.

When the braking process of the tractor and the trailer is ended, the activating mechanism 16 returns to the starting position. The pressure medium source connected to the pressure medium line 6 is closed off from the pressure medium lines 4 and 7. The pressure medium lines 4 and 7 are vented to the atmosphere via the brake valve 5.

Because of the pressure drop occurring in the pressure medium chamber 22, the control piston 24, as a result of the pressure of the pressure medium chamber 37 acting on the active surface 30, moves into a postion in which the inlet valve 33, 35 is closed and the outlet valve 32, 33 is open. The pressure medium in the pressure medium chamber 37 is conducted into the atmosphere via the outlet 41.

In the starting position of the activating mechanism 16, the current feed to the electrical control input 15 of the distributing valve 10 is interrupted. The distributing valve 10 has assumed the starting position, in which the pressure medium chamber 17 is connected via the outlet 12 with the atmosphere. On account of the force of the return spring 20, the control piston 19 is returned to the starting position. Thus, the brake process of the trailer vehicle is terminated.

According to another alternative embodiment of the present invention, instead of the electrical switching apparatus 13, a pneumatic switching apparatus can also be used, which transports a pressure medium to a pneumatic control input of the distributing valve 10, e. g., from the pressure medium source connected to the pressure medium line 11.

While both the presently preferred and a number of alternative embodiments of the present invention have been described in detail above, it should be understood by those persons who are skilled in the vehicle braking art that other modifications and adaptations of the invention can be made without departing from the spirit and scope of the appended claims.

We claim:

1. An apparatus to control a braking pressure of a trailer portion of a tractor-trailer combination, said apparatus comprising:
   (a) a valve having a first control piston which moves in a first direction in response to a brake control pressure released by a brake valve;
   (b) a second control piston in said valve which moves in said first direction in response to a pressure from a switchable distribution valve means that is connected to a pressure medium source, said first and said second control pistons being movable in relation to each other, said distribution valve means connecting said second control piston with said pressure medium source in response to a position of an activation mechanism of said brake valve, said second control piston being capable of being pressurized before said first control piston;
   (c) a valve means activated by at least one of said first and said second control pistons for connecting a brake apparatus of such trailer with a pressure medium source;
   (d) a first spring means for connecting said first control piston with said second control piston;
   (e) adjusting means engageable with said first spring means for adjusting a force exerted by said spring between said first and said second control pistons:
   (f) a second spring means caged between said first piston and a housing wall of said valve for urging both said first piston and said second piston in a second direction; and
   (g) a first pressure medium chamber corresponding to said second control piston and which is sealed off from a second pressure medium chamber that corresponds to said first control piston, said first medium chamber being bounded by an effective surface of said second control piston, said first pressure medium chamber being pressurized by pressure from said pressure medium source through said distribution valve means.

2. An apparatus, according to claim 1, wherein said adjusting means includes at least one set screw acting axially to a winding of said first spring means and a spring plate.

3. An apparatus, according to claim 1, wherein said adjusting means is positioned on said first control piston.

4. An apparatus, according to claim 2, wherein said adjusting means is positioned on said first control piston.

5. An apparatus, according to claim 1, wherein said apparatus further includes a stop means connected on a housing of said valve for limiting a stroke of said second control piston in a direction of a force being exerted by said pressure medium source.

6. An apparatus, according to claim 2, wherein said apparatus further includes a stop means connected on a housing of said valve for limiting a stroke of said second control piston in a direction of a force being exerted by said pressure medium source.

7. An apparatus, according to claim 3, wherein said apparatus further includes a stop means connected on a housing of said valve for limiting a stroke of said second control piston in a direction of a force being exerted by said pressure medium source.

8. An apparatus, according to claim 4, wherein said apparatus further includes a stop means connected on a housing of said valve for limiting a stroke of said second control piston in a direction of a force being exerted by said pressure medium source.

9. An apparatus, according to claim 1, wherein said first control piston and said second control piston are telescoping and are movable in relation to each other.

10. An apparatus, according to claim 2, wherein said first control piston and said second control piston are telescoping and are movable in relation to each other.

11. An apparatus, according to claim 3, wherein said first control piston and said second control piston are telescoping and are movable in relation to each other.

12. An apparatus, according to claim 4, wherein said first control piston and said second control piston are telescoping and are movable in relation to each other.

13. An apparatus, according to claim 5, wherein said first control piston and said second control piston are telescoping and are movable in relation to each other.

14. An apparatus, according to claim 6, wherein said first control piston and said second control piston are telescoping and are movable in relation to each other.

* * * * *